(12) United States Patent
Yuan et al.

(10) Patent No.: US 12,556,305 B2
(45) Date of Patent: Feb. 17, 2026

(54) MIXED WAVEFORM FOR PHYSICAL UPLINK SHARED CHANNEL REPETITION

(71) Applicant: QUALCOMM Incorporated, San Diego, CA (US)

(72) Inventors: Fang Yuan, Beijing (CN); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 17/905,718

(22) PCT Filed: Apr. 20, 2020

(86) PCT No.: PCT/CN2020/085540
§ 371 (c)(1),
(2) Date: Sep. 6, 2022

(87) PCT Pub. No.: WO2021/212259
PCT Pub. Date: Oct. 28, 2021

(65) Prior Publication Data
US 2023/0344555 A1  Oct. 26, 2023

(51) Int. Cl.
*H04L 1/08* (2006.01)
*H04L 5/00* (2006.01)
(Continued)

(52) U.S. Cl.
CPC .............. *H04L 1/08* (2013.01); *H04L 5/0048* (2013.01); *H04L 5/0091* (2013.01); *H04L 27/2607* (2013.01); *H04W 72/23* (2023.01)

(58) Field of Classification Search
CPC ....... H04B 7/0456; H04L 1/08; H04L 1/0003; H04L 1/0009; H04L 1/1864;
(Continued)

(56) References Cited

U.S. PATENT DOCUMENTS

2019/0222399 A1   7/2019  Huang et al.
2019/0320469 A1  10/2019  Huang et al.
(Continued)

FOREIGN PATENT DOCUMENTS

CN          108737311 A    11/2018
WO    WO-2018081050 A1     5/2018
(Continued)

OTHER PUBLICATIONS

International Search Report and Written Opinion—PCT/CN2020/085540—ISA/EPO—Jan. 22, 2021.
(Continued)

*Primary Examiner* — Mansour Oveissi
(74) *Attorney, Agent, or Firm* — Harrity & Harrity, LLP

(57) ABSTRACT

Various aspects of the present disclosure generally relate to wireless communication. In some aspects, a user equipment may receive a physical uplink shared channel (PUSCH) configuration that configures a first waveform and a second waveform that is different than the first waveform; and transmit, based at least in part on the PUSCH configuration, a first PUSCH repetition using one of the first waveform or the second waveform, and a second PUSCH repetition using the other one of the first waveform or the second waveform. Numerous other aspects are provided.

30 Claims, 8 Drawing Sheets

(51) Int. Cl.
*H04L 27/26* (2006.01)
*H04W 72/23* (2023.01)

(58) Field of Classification Search
CPC ... H04L 1/1887; H04L 1/189; H04L 27/2607; H04L 5/0023; H04L 5/0044; H04L 5/0048; H04L 5/0091; H04W 72/23
See application file for complete search history.

(56) References Cited

U.S. PATENT DOCUMENTS

| | | | |
|---|---|---|---|
| 2020/0076670 A1 | 3/2020 | Liu et al. | |
| 2020/0107235 A1 | 4/2020 | Peisa et al. | |
| 2020/0154428 A1* | 5/2020 | Takeda | H04L 27/2636 |
| 2021/0367743 A1* | 11/2021 | Kim | H04L 5/0098 |
| 2022/0150928 A1* | 5/2022 | Choi | H04L 5/0044 |
| 2022/0200759 A1* | 6/2022 | Yoshioka | H04L 5/0007 |

FOREIGN PATENT DOCUMENTS

| | | |
|---|---|---|
| WO | WO-2018203397 A1 | 11/2018 |
| WO | 2018231626 A1 | 12/2018 |
| WO | 2019104552 A1 | 6/2019 |

OTHER PUBLICATIONS

Lg Electronic: "Physical Layer Design of UL Signals and Channels for NR Unlicensed", 3GPP TSG RAN WG1 Meeting #95, R1-1812559, Nov. 16, 2018 (Nov. 16, 2018), 11 Pages, the whole document.
Supplementary European Search Report—EP20932576—Search Authority—The Hague—Dec. 14, 2023-12-14.

* cited by examiner

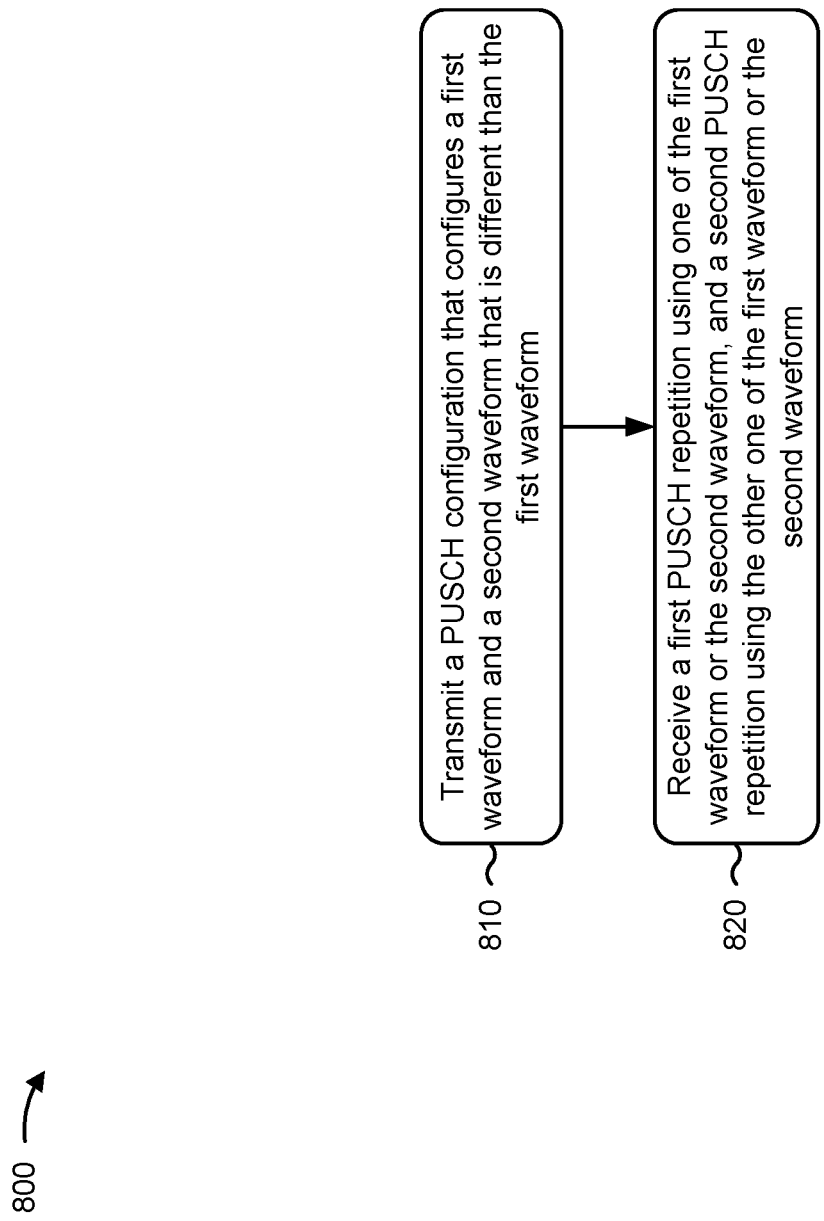

MIXED WAVEFORM FOR PHYSICAL UPLINK SHARED CHANNEL REPETITION

CROSS-REFERENCE TO RELATED APPLICATION

This Patent Application claims priority to Patent Cooperation Treaty (PCT) Patent Application No. PCT/CN2020/085540, filed on Apr. 20, 2020, entitled "MIXED WAVEFORM FOR PHYSICAL UPLINK SHARED CHANNEL REPETITION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for physical uplink shared channel repetition with mixed waveforms.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a physical uplink shared channel (PUSCH) configuration that configures a first waveform and a second waveform that is different than the first waveform; and transmitting, based at least in part on the PUSCH configuration, a first PUSCH repetition using one of the first waveform or the second waveform, and a second PUSCH repetition using the other one of the first waveform or the second waveform.

In some aspects, a method of wireless communication, performed by a base station, may include transmitting a PUSCH configuration that configures a first waveform and a second waveform that is different than the first waveform; and receiving, based at least in part on the PUSCH configuration, a first PUSCH repetition using one of the first waveform or the second waveform, and a second PUSCH repetition using the other one of the first waveform or the second waveform.

In some aspects, a UE for wireless communication may include a memory and one or more processors operatively coupled to the memory. The memory and the one or more processors may be configured to receive a PUSCH configuration that configures a first waveform and a second waveform that is different than the first waveform; and transmit, based at least in part on the PUSCH configuration, a first PUSCH repetition using one of the first waveform or the second waveform, and a second PUSCH repetition using the other one of the first waveform or the second waveform.

In some aspects, a base station for wireless communication may include a memory and one or more processors operatively coupled to the memory. The memory and the one or more processors may be configured to transmit a PUSCH configuration that configures a first waveform and a second waveform that is different than the first waveform; and receive, based at least in part on the PUSCH configuration, a first PUSCH repetition using one of the first waveform or the second waveform, and a second PUSCH repetition using the other one of the first waveform or the second waveform.

In some aspects, a non-transitory computer-readable medium may store one or more instructions for wireless communication. The one or more instructions, when executed by one or more processors of a UE, may cause the one or more processors to receive a PUSCH configuration that configures a first waveform and a second waveform that is different than the first waveform; and transmit, based at least in part on the PUSCH configuration, a first PUSCH repetition using one of the first waveform or the second waveform, and a second PUSCH repetition using the other one of the first waveform or the second waveform.

In some aspects, a non-transitory computer-readable medium may store one or more instructions for wireless communication. The one or more instructions, when executed by one or more processors of a base station, may cause the one or more processors to transmit a PUSCH configuration that configures a first waveform and a second waveform that is different than the first waveform; and receive, based at least in part on the PUSCH configuration, a first PUSCH repetition using one of the first waveform or the second waveform, and a second PUSCH repetition using the other one of the first waveform or the second waveform.

In some aspects, an apparatus for wireless communication may include means for receiving a PUSCH configuration that configures a first waveform and a second waveform that is different than the first waveform; and means for transmitting, based at least in part on the PUSCH configuration, a first PUSCH repetition using one of the first waveform or the second waveform, and a second PUSCH repetition using the other one of the first waveform or the second waveform.

In some aspects, an apparatus for wireless communication may include means for transmitting a PUSCH configuration that configures a first waveform and a second waveform that is different than the first waveform; and means for receiving, based at least in part on the PUSCH configuration, a first PUSCH repetition using one of the first waveform or the second waveform, and a second PUSCH repetition using the other one of the first waveform or the second waveform.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
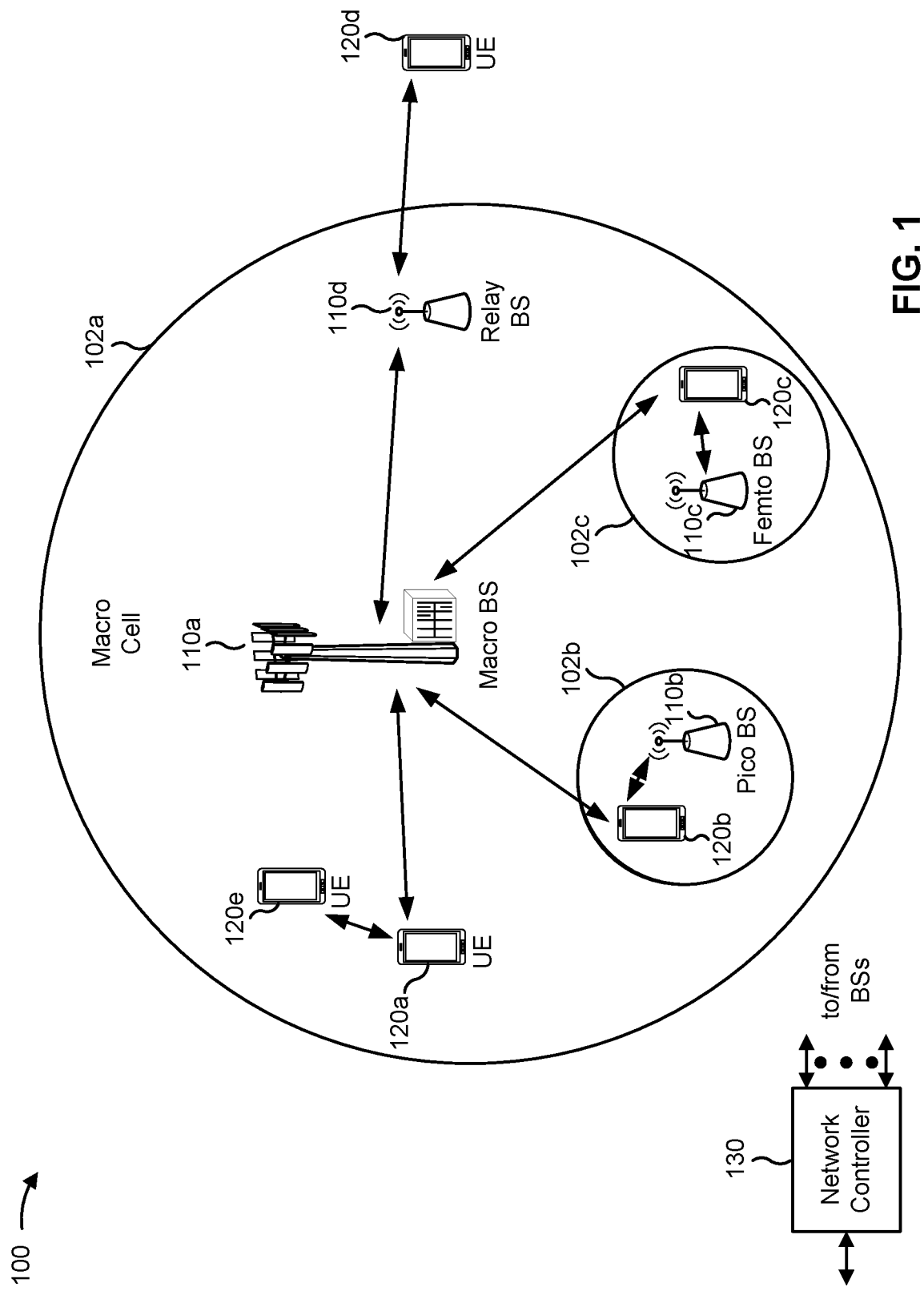
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband interne of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
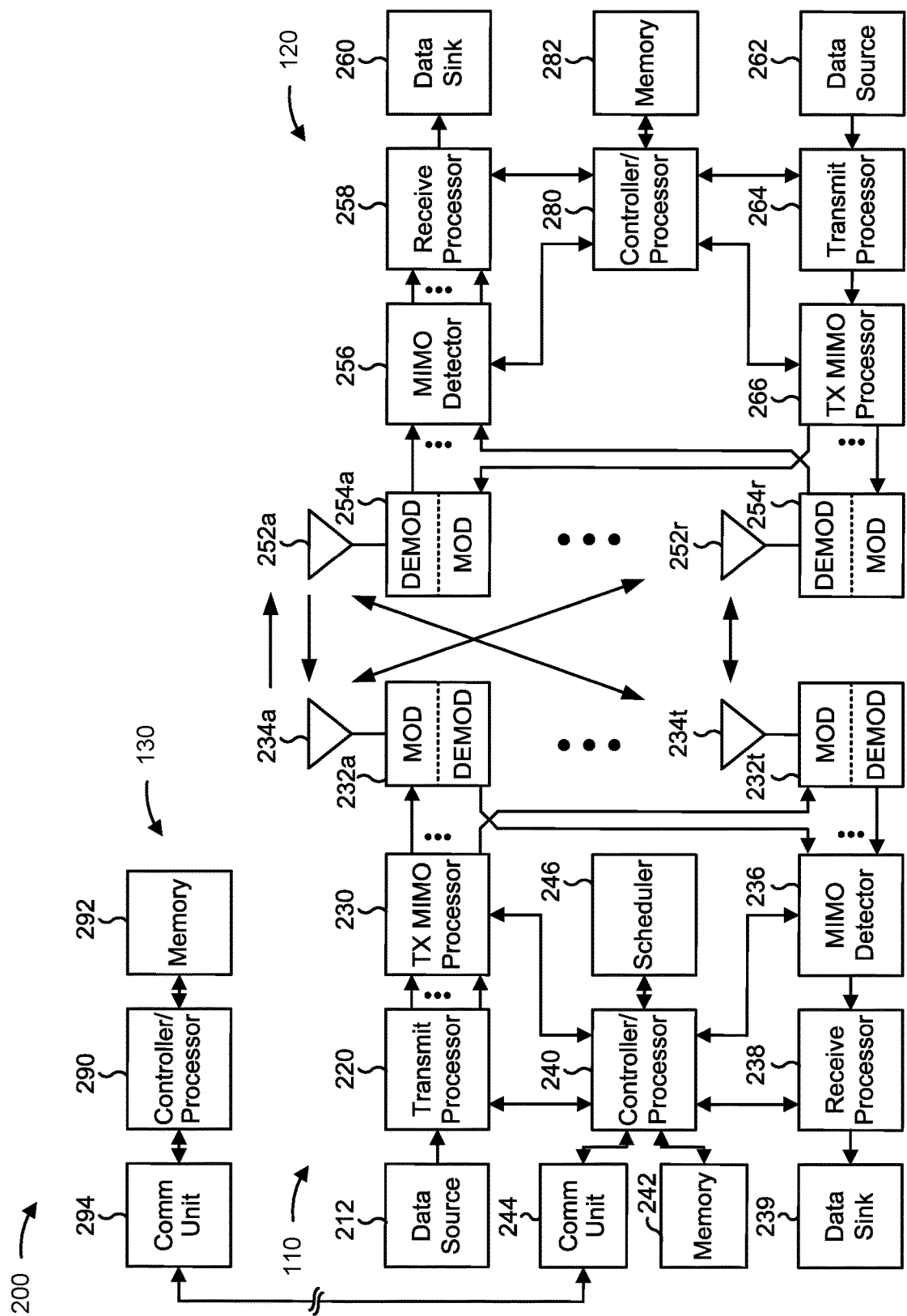
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate)

the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with physical uplink shared channel (PUSCH) repetition with mixed waveforms as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 700 of FIG. 7, process 800 of FIG. 8, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving a PUSCH configuration that configures a first waveform and a second waveform that is different than the first waveform, means for transmitting, based at least in part on the PUSCH configuration, a first PUSCH repetition using one of the first waveform or the second waveform, and a second PUSCH repetition using the other one of the first waveform or the second waveform, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a PUSCH configuration that configures a first waveform and a second waveform that is different than the first waveform, means for receiving, based at least in part on the PUSCH configuration, a first PUSCH repetition using one of the first waveform or the second waveform, and a second PUSCH repetition using the other one of the first waveform or the second waveform, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
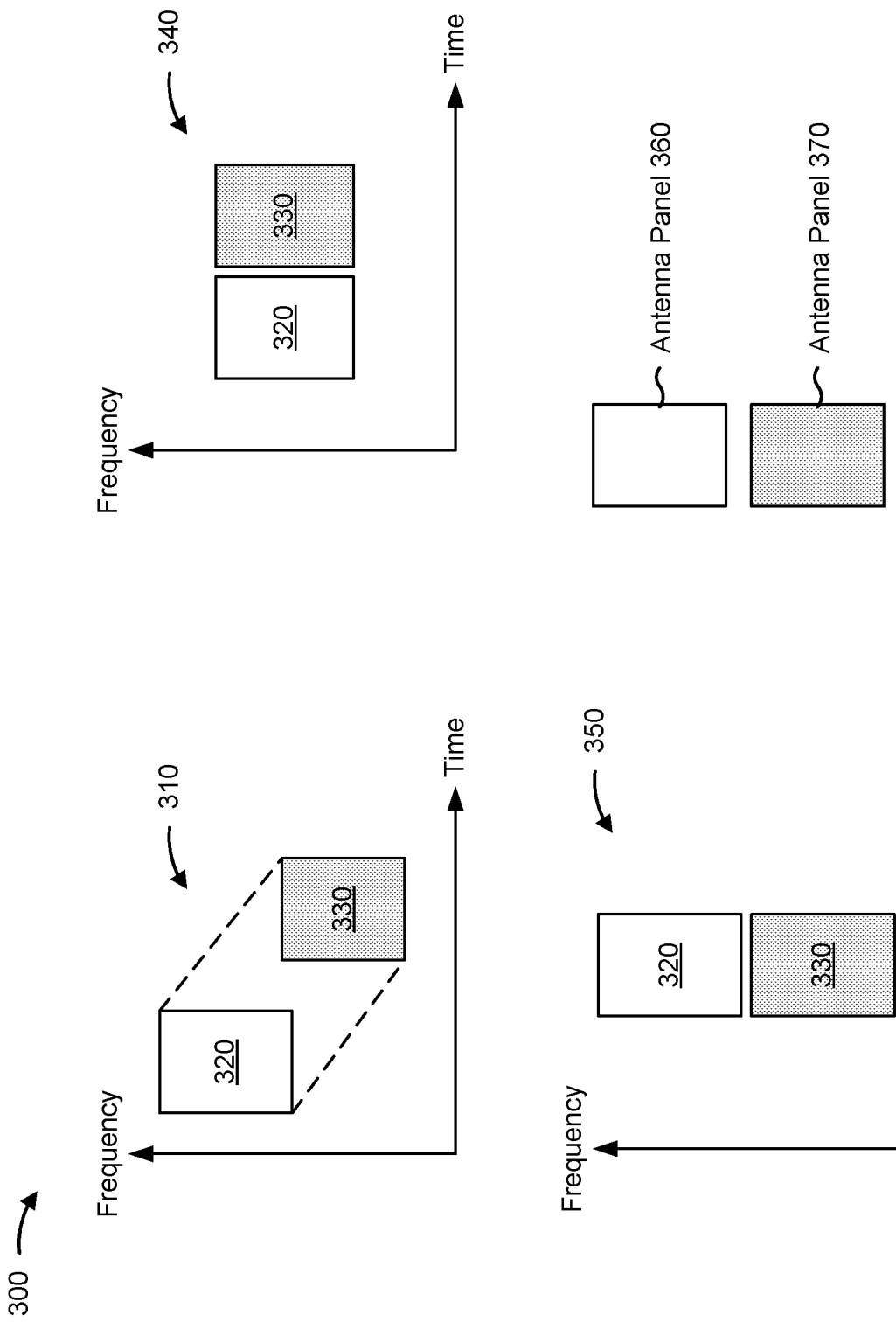
FIG. 3 is a diagram illustrating an example of multi-panel uplink transmission, in accordance with various aspects of the present disclosure.

FIG. 3 is a diagram illustrating an example 300 of multi-panel uplink transmission, in accordance with various aspects of the present disclosure. A UE 120 and a BS 110 may communicate in connection with an uplink multi-panel transmission of the UE 120. The UE 120 may employ multiple transmit antenna panels. The antenna panels may be a group of antenna ports or an antenna group. The uplink multi-panel transmission may be in a spatial-division multiplexed manner, a time-division multiplexed manner, or a frequency-division multiplexed manner.

FIG. 3 shows a spatial-division multiplexing (SDM) 310 of a first PUSCH transmission occasion 320 and a second PUSCH transmission occasion 330, a time-division multiplexing (TDM) 340 of the PUSCH transmission occasions 320 and 330, and a frequency-division multiplexing (FDM) 350 of the PUSCH transmission occasions 320 and 330.

According to the SDM 310 (e.g., non-coherent joint transmission), the UE 120 may transmit the first PUSCH transmission occasion 320 (shown as a first layer) and the second PUSCH transmission occasion 330 (shown as a second layer superimposed over the first layer) in a same time and frequency resource, but different spatial resources. According to the TDM 340, the UE 120 may transmit the first PUSCH transmission occasion 320 and the second PUSCH transmission occasion 330 in a same frequency resource and different time resources. According to FDM 350, the UE 120 may transmit the first PUSCH transmission occasion 320 and the second PUSCH transmission occasion 330 in the same time resource and different frequency resources.

In some aspects, the UE 120 may transmit the first PUSCH transmission occasion 320 using a first antenna panel 360, and the UE 120 may transmit the second PUSCH transmission occasion 330 using a second antenna panel 370. In other words, the UE 120 may form a first beam on the first antenna panel 360 and the UE 120 may form a second beam on the second antenna panel 370.

For a codebook-based MIMO, a transmitted precoding matrix indicator (TPMI) index per antenna panel may be identified by DCI, an uplink transmission configuration indicator (TCI) per antenna panel may be identified by DCI, and a sounding reference signal (SRS) set for codebook per panel may be radio resource control (RRC) configured. For non-codebook-based MIMO, an SRS resource indicator (SRI) index per antenna panel may be identified by DCI, an uplink TCI per antenna panel may be identified by DCI, and an SRS set for non-codebook per panel may be RRC configured. The uplink TCI is used to indicate a beam for the antenna panel, which can be a beam associated with the indicated reference signal ID. The SRS set ID may be used to indicate the antenna panel ID, where each antenna panel is associated with an SRS set.

Some wireless communication standards support multiple waveforms to be RRC configured for PUSCH transmission. Typically, for each PUSCH transmission, only one waveform can be used. The waveform may be a discrete Fourier transform spread orthogonal frequency division multiplexing (DFT-s-OFDM) waveform, a cyclic prefix orthogonal frequency division multiplexing (CP-OFDM) waveform, and/or the like. In those wireless standards, if transform precoding is enabled, the DFT-s-OFDM waveform is used and, if transform precoding is not enabled, the CP-OFDM is used.

Different mechanisms are used to determine whether transform precoding is enabled. If a DCI with a scheduling grant was received with DCI format 0_0, the UE may, for this PUSCH transmission, consider the transform precoding either enabled or disabled according to a higher layer configured parameter msg3-transformPrecoder. If the DCI with the scheduling grant was not received with DCI format 0_0, and if the UE is configured with the higher layer parameter transformPrecoder in pusch-Config, the UE may consider the transform precoding either enabled or disabled according to this parameter. If the UE is not configured with the higher layer parameter transformPrecoder in pusch-Config, the UE may consider the transform precoding either enabled or disabled according to the higher layer configured parameter msg3-transformPrecoder.

Different panels, beams, and/or the like may have respective signal characteristics that interact differently with different waveforms. For example, a first panel may produce a more powerful and/or less noisy transmission using a DFT-s-OFDM waveform than a second panel, which may produce a more powerful and/or less noisy transmission using a CP-OFDM waveform. Thus, if the first panel is used for a first PUSCH repetition and the second panel is used for a second PUSCH repetition, and both use the same waveform, one of the repetitions may be of lower quality than the other, reducing the likelihood of a successful transmission.

In some aspects described herein, techniques are provided for using mixed waveforms for PUSCH repetition. In this way, a first PUSCH repetition may be transmitted using a first waveform and a second PUSCH repetition may be transmitted using a second waveform, enabling more efficient use of time and frequency resources and increasing the likelihood of a successful transmission.

As indicated above, FIG. 3 is provided as an example. Other examples may differ from what is described with respect to FIG. 3.

Figure 4:
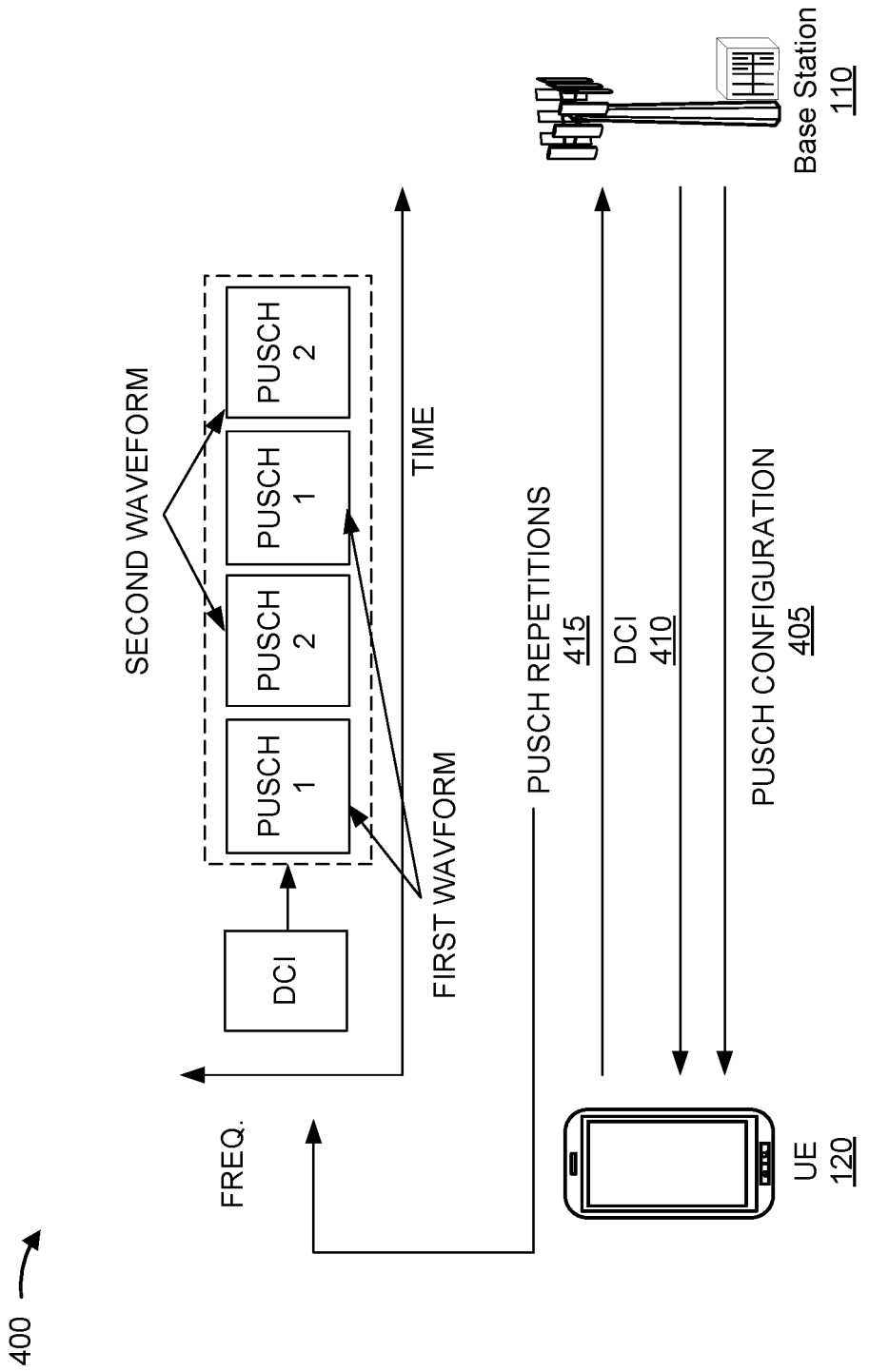
FIGS. 4-6 are diagrams illustrating examples of physical uplink shared channel repetition with mixed waveforms, in accordance with various aspects of the present disclosure.

FIG. 4 is a diagram illustrating an example 400 of PUSCH repetition with mixed waveforms, in accordance with various aspects of the present disclosure. As shown, a base station 110 and a UE 120 may communicate with one another.

As shown by reference number 405, the base station 110 may transmit, and the UE 120 may receive, a PUSCH configuration that configures a first waveform and a second waveform that is different than the first waveform. In some aspects, the first waveform may include a discrete Fourier transform spread orthogonal frequency division multiplexing (DFT-s-OFDM) waveform and the second waveform may include a cyclic prefix orthogonal frequency division multiplexing (CP-OFDM) waveform.

In some aspects, the PUSCH configuration may be carried in an RRC message. The RRC message may configure a transform precoder parameter. In some aspects, the transform precoder parameter may enable or disable the first waveform and the second waveform based on a value, of a set of enumerated values, that is assigned to the transform precoder parameter. The set of enumerated values may include a first value that corresponds to a transmission state in which the first waveform is enabled and the second waveform is disabled, a second value that corresponds to a transmission state in which the first waveform is disabled and the second waveform is enabled, a third value that corresponds to a transmission state in which the first waveform is enabled and the second waveform is enabled, and/or the like.

As shown by reference number 410, the base station 110 may transmit, and the UE 120 may receive, a downlink control information (DCI) transmission (shown as DCI) that may schedule a first PUSCH repetition (shown as PUSCH 1) and a second PUSCH repetition (shown as PUSCH 2). The DCI may schedule any number of additional PUSCH repetitions. The DCI transmission also may indirectly indicate the waveform that is to be associated with each PUSCH repetition. This determination may be made based at least in part on another association that may be established, for example, by the PUSCH configuration.

In some aspects, the PUSCH configuration may associate the first waveform with a first beam identifier (ID) and the second waveform with a second beam ID, and the DCI transmission may indicate an association between the first beam ID and one of the first PUSCH repetition or the second PUSCH repetition, and an association between the second beam ID and the other one of the first PUSCH repetition or the second PUSCH repetition. The beam ID may be provided by a reference signal ID, such as an synchronization signal block (SSB) index, Channel-state-information (CSI)-RS, or Sounding reference signal (SRS) ID.

In some aspects, the PUSCH configuration may associate the first waveform with a first panel ID and the second waveform with a second panel ID. The DCI transmission may indicate an association between the first panel ID and one of the first PUSCH repetition or the second PUSCH repetition, and an association between the second panel ID and the other one of the first PUSCH repetition or the second PUSCH repetition. The panel ID may be an explicit identity, such as a control resource set (CORESET) pool index value. In some aspect, the panel ID may be implicitly associated with a reference signal ID, such as CSI-RS, SSB, SRS, and/or the like. In some aspects, the panel ID may be associated with a group of CSI-RS or SRS ports, or a set identifier of CSI-RS or SRS resource set.

In some aspects, the PUSCH configuration may associate the first waveform with a first transmission configuration indicator (TCI) ID and the second waveform with a second TCI ID, and the DCI transmission may indicate an association between the first TCI ID and one of the first PUSCH repetition or the second PUSCH repetition, and an association between the second TCI ID and the other one of the first PUSCH repetition or the second PUSCH repetition. The TCI ID may be associated with a reference signal ID, such as CSI-RS, SSB, SRS, and/or the like. In some aspects, the TCI ID may be associated with a serving cell index, a bandwidth part index, and/or the like.

In some aspects, the PUSCH configuration may associate the first waveform with a first sounding reference signal (SRS) resource indicator (SRI) ID and the second waveform with a second SRI ID, and the DCI transmission may indicate an association between the first SRI ID and one of the first PUSCH repetition or the second PUSCH repetition, and an association between the second SRI ID and the other one of the first PUSCH repetition or the second PUSCH repetition. In some aspects, the SRS may be configured for codebook-based MIMO transmission.

In some aspects, the PUSCH configuration may associate the first waveform with a first transmitted precoding matrix indicator (TPMI) and the second waveform with a second TPMI, and the DCI transmission may indicate an association between the first TPMI and one of the first PUSCH repetition or the second PUSCH repetition, and an association between the second TPMI and the other one of the first PUSCH repetition or the second PUSCH repetition.

In some aspects, the PUSCH configuration may associate the first waveform with a first SRS set ID and the second waveform with a second SRS set ID, and the DCI transmission may indicate an association between the first SRS set ID and one of the first PUSCH repetition or the second PUSCH repetition, and an association between the second SRS set ID and the other one of the first PUSCH repetition or the second PUSCH repetition. In some aspects, the SRS set may be configured for non-codebook-based MIMO transmission.

As shown by reference number 415, the UE 120 may transmit, and the base station 110 may receive, a plurality of PUSCH repetitions. The PUSCH repetitions may be transmitted based at least in part on the PUSCH configuration, the DCI transmission, and/or the like. The PUSCH repetitions may include a first PUSCH repetition transmitted using one of the first waveform or the second waveform, and a second PUSCH repetition transmitted using the other one of the first waveform or the second waveform. In some aspects, both PUSCH repetitions may be transmitted using the same waveform. In some aspects, the UE 120 may multiplex the first PUSCH repetition and the second PUSCH repetition using at least one of frequency division multiplexing, time division multiplexing (as shown in FIG. 4), and/or the like.

In some aspects, an RRC configured waveform association may be updated using a medium access control control element (MAC-CE). In some aspects, the UE 120 may create an initial waveform association by associating, using a MAC-CE, a first set of PUSCH occasions with the first waveform, and a second set of PUSCH occasions with the second waveform. The first set of PUSCH occasions may be associated with a first uplink beam and the second set of PUSCH occasions may be associated with a second uplink beam. The first PUSCH repetition may be associated with at least one PUSCH occasion of the first set of PUSCH occasions and the second PUSCH repetition may be associated with at least one PUSCH occasion of the second set of PUSCH occasions. The UE 120 may create an updated waveform association by updating the initial waveform association using another MAC-CE. In some aspects, the UE 120 may update the initial waveform association by associating, using the other MAC-CE, the first set of PUSCH occasions with the first waveform and the second set of PUSCH occasions with the second waveform.

In some aspects described above, techniques are provided for using mixed waveforms for PUSCH repetition. In this way, a first PUSCH repetition may be transmitted using a first waveform and a second PUSCH repetition may be transmitted using a second waveform, enabling more efficient use of time and frequency resources and increasing the likelihood of a successful transmission.

As indicated above, FIG. 4 is provided as an example. Other examples may differ from what is described with respect to FIG. 4.

Figure 5:
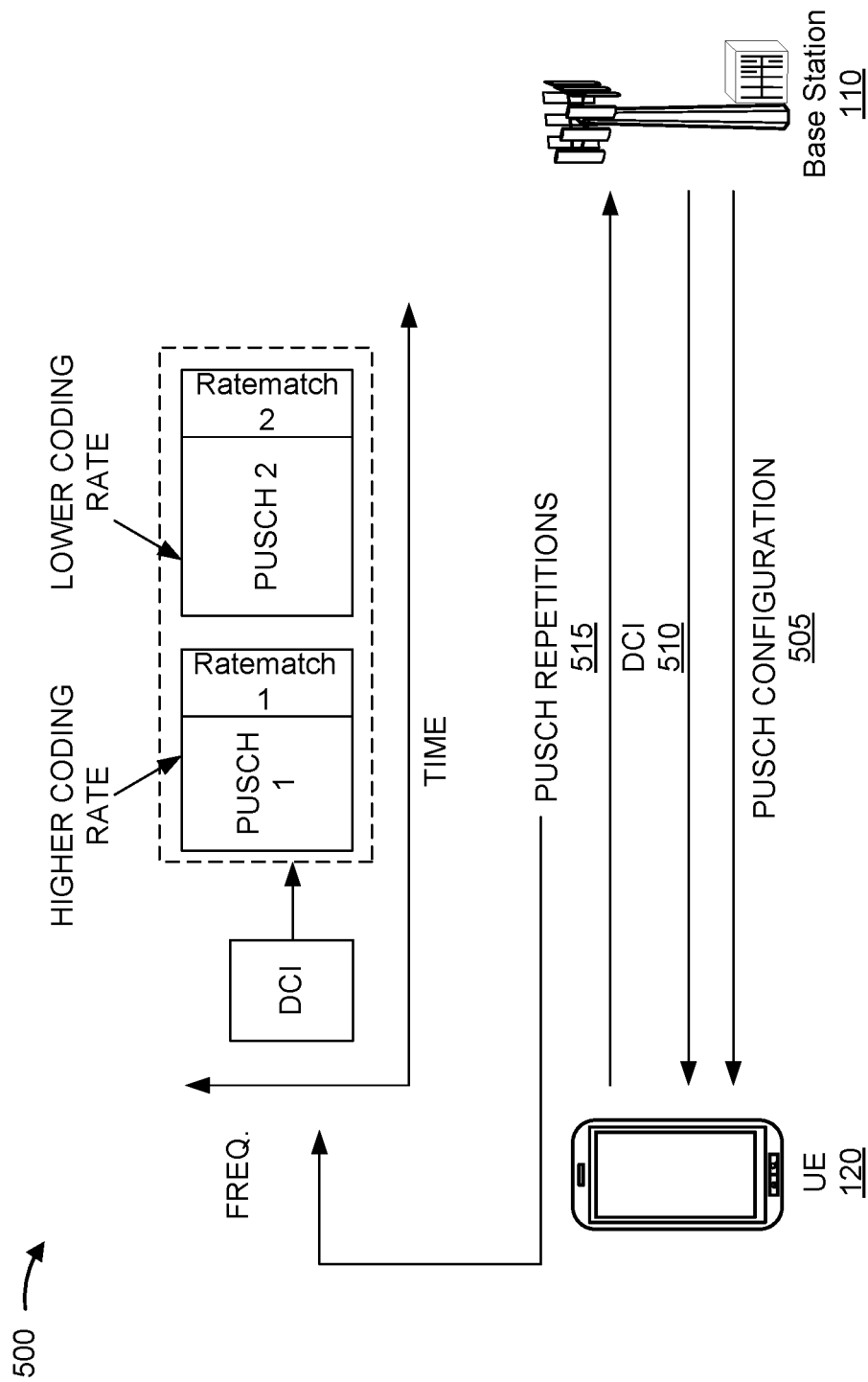

FIG. 5 is a diagram illustrating an example 500 of PUSCH repetition with mixed waveforms, in accordance with various aspects of the present disclosure. As shown, a base station 110 and a UE 120 may communicate with one another.

As shown by reference number 505, the base station 110 may transmit, and the UE 120 may receive, a PUSCH configuration that configures a first waveform and a second waveform that is different than the first waveform. In some aspects, the first waveform may include a DFT-s-OFDM waveform and the second waveform may include a CP-OFDM waveform. The PUSCH configuration may be carried in an RRC message.

As shown by reference number 510, the base station 110 may transmit, and the UE 120 may receive, a DCI transmission (shown as DCI) that may schedule a first PUSCH repetition (shown as PUSCH 1) and a second PUSCH repetition (shown as PUSCH 2). The DCI may schedule any number of additional PUSCH repetitions. The DCI transmission also may indirectly indicate the waveform that is to be associated with each PUSCH repetition. This determination may be made based at least in part on another association that may be established, for example, by the PUSCH configuration.

As shown by reference number 515, the UE 120 may transmit, and the base station 110 may receive, the first PUSCH repetition and the second PUSCH repetition. The PUSCH repetitions may be transmitted based at least in part on the PUSCH configuration, the DCI transmission, and/or the like. The first PUSCH repetition may be transmitted using one of the first waveform or the second waveform, and the second PUSCH repetition may be transmitted using the other one of the first waveform or the second waveform. In some aspects, both PUSCH repetitions may be transmitted using the same waveform. In some aspects, the UE 120 may multiplex the first PUSCH repetition and the second PUSCH repetition using at least one of frequency division multiplexing, time division multiplexing (as shown in FIG. 5), and/or the like.

In some aspects, the PUSCH configuration may associate the first waveform with a first effective coding rate and the second waveform with a second effective coding rate. The DCI transmission may schedule the first PUSCH repetition to be transmitted in a first PUSCH occasion and the second PUSCH repetition to be transmitted in a second PUSCH occasion. The DCI transmission may indicate an association between the first effective coding rate and one of the first PUSCH occasion or the second PUSCH occasion, and an association between the second effective coding rate and the other one of the first PUSCH occasion or the second PUSCH occasion.

In some aspects, the UE 120 may perform, based at least in part on the first effective coding rate and the second effective coding rate, a rate-matching procedure, a puncturing procedure, and/or the like. For example, as shown in FIG. 5, the second PUSCH occasion may have more OFDM symbols available than the first PUSCH occasion. Rate matching may be used to achieve a higher coding rate in the first PUSCH occasion than a coding rate of the second PUSCH occasion.

In some aspects, the PUSCH configuration may associate the first waveform and the second waveform with a coding rate threshold, and the DCI transmission may indicate an association between a first coding rate value that satisfies the coding rate threshold and one of the first PUSCH occasion or the second PUSCH occasion, and an association between a second coding rate value that fails to satisfy the coding rate threshold and the other one of the first PUSCH occasion or the second PUSCH occasion. The threshold may be configured by RRC signaling or predetermined as a fixed value.

In some aspects, the PUSCH configuration may associate the first waveform with a first demodulation reference signal (DMRS) configuration and the second waveform with a second DMRS configuration, and the DCI transmission may indicate an association between the first DMRS configuration and one of the first PUSCH occasion or the second PUSCH occasion, and an association between the second DMRS configuration and the other one of the first PUSCH occasion or the second PUSCH occasion. In some aspects, the first DMRS configuration may include a DMRS port indication and the second DMRS configuration may include the DMRS port indication. In some aspects, the DMRS port indication may indicate a first DMRS port associated with one of the first PUSCH occasion or the second PUSCH occasion, and a second DMRS port associated with the other one of the first PUSCH occasion or the second PUSCH occasion.

In some aspects, the first DMRS configuration may include a first DMRS port index, of a first set of DMRS port indices having a first quantity of DMRS port indices and associated with the first waveform, and the second DMRS configuration may include a second DMRS port index, of a second set of DMRS port indices having a second quantity of DMRS port indices and associated with the second waveform. The second quantity may be greater than the first quantity, and the second DMRS port index may be selected from a subset of DMRS indices of the second set of DMRS port indices corresponding to the first set of DMRS port indices.

As indicated above, FIG. 5 is provided as an example. Other examples may differ from what is described with respect to FIG. 5.

Figure 6:
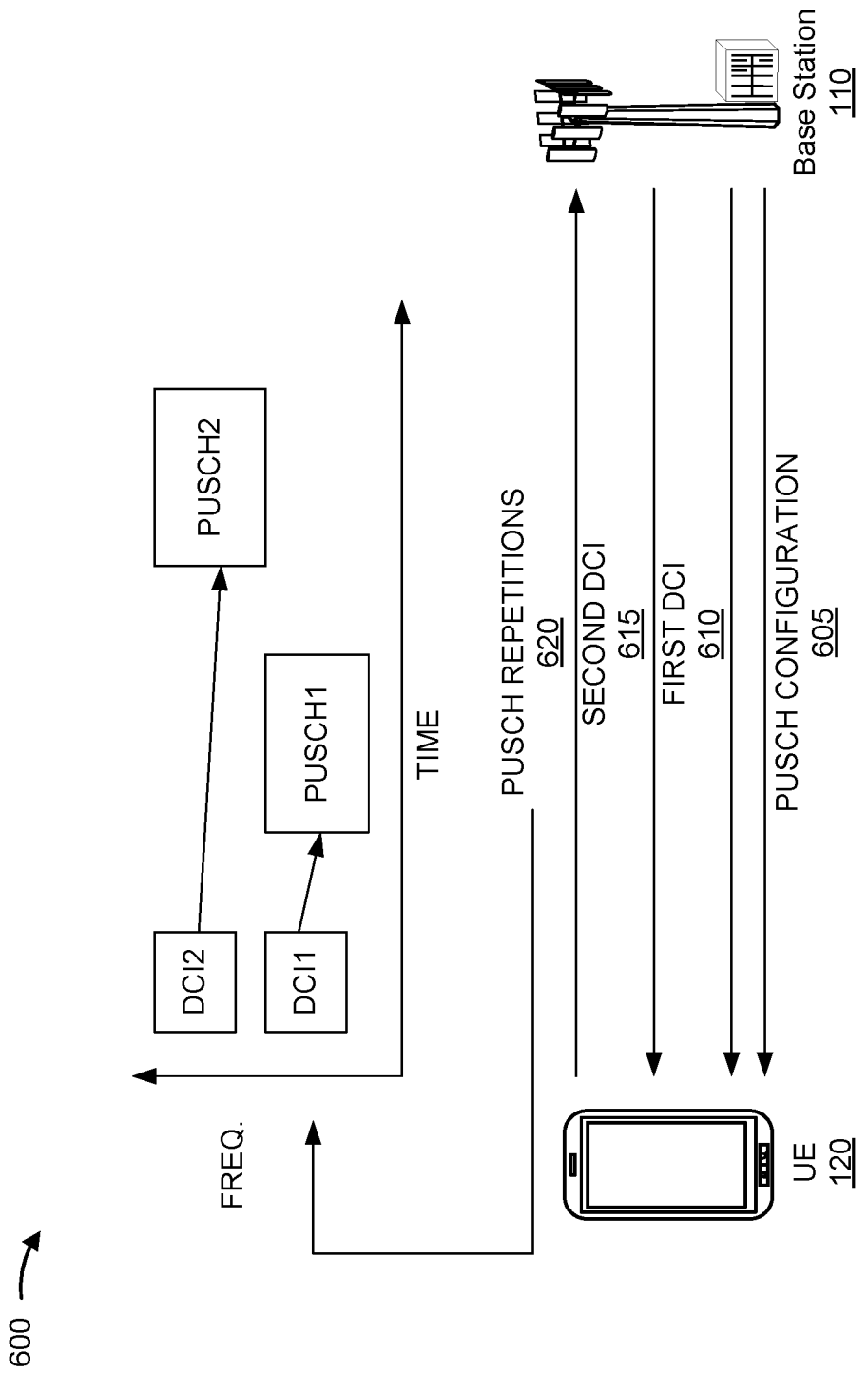

FIG. 6 is a diagram illustrating an example 600 of PUSCH repetition with mixed waveforms, in accordance with various aspects of the present disclosure. As shown, a base station 110 and a UE 120 may communicate with one another.

As shown by reference number 605, the base station 110 may transmit, and the UE 120 may receive, a PUSCH configuration that configures a first waveform and a second waveform that is different than the first waveform. In some aspects, the first waveform may include a DFT-s-OFDM waveform and the second waveform may include a CP-OFDM waveform. The PUSCH configuration may be carried in an RRC message.

As shown by reference number 610, the base station 110 may transmit, and the UE 120 may receive, a first DCI transmission (shown as DCI 1) that may schedule a first PUSCH repetition (shown as PUSCH 1). As shown by reference number 615, the base station 110 may transmit, and the UE 120 may receive, a second DCI transmission (shown as DCI 2) that may schedule a second PUSCH repetition (shown as PUSCH 2). The first DCI transmission and/or the second DCI transmission may schedule any number of additional PUSCH repetitions. The DCI transmissions also may indirectly indicate the waveform that is to be associated with each PUSCH repetition. This determination may be made based at least in part on another association that may be established, for example, by the PUSCH configuration.

In some aspects, the first DCI transmission may indicate a first association between the first PUSCH repetition and one of the first waveform or the second waveform. The second DCI transmission may indicate a second association between the second PUSCH repetition and the other one of the first waveform or the second waveform. The first DCI may be transmitted in a CORESET with a first CORESET pool index value, and the second DCI may be transmitted in another CORESET with a second CORESET pool index value. In some aspects, the first association may be based at least in part on a first modulation and coding scheme (MCS) corresponding to the first PUSCH repetition, and the second association may be based at least in part on a second MCS corresponding to the second PUSCH repetition. In some aspects, the first association and the second association may be based at least in part on a comparison between a value of the first MCS and a value of the second MC. In some aspects, the first association may be based at least in part on determining whether a value of the first MCS satisfies a threshold, and the second association may be based at least in part on determining whether a value of the second MCS satisfies the threshold. The threshold may be configured by RRC signaling, or predetermined as a fixed value.

In some aspects, the first association may be based at least in part on a first uplink TCI pool corresponding to the first DCI transmission, and the second association may be based at least in part on a second TCI pool corresponding to the second DCI transmission. In some aspects, the first association may be based at least in part on a first CORESET corresponding to the first DCI transmission, and the second association may be based at least in part on a second CORESET corresponding to the second DCI transmission. The first DCI may be transmitted in a CORESET with a first CORESET pool index value, and the second DCI may be transmitted in another CORESET with a second CORESET pool index value.

In some aspects, the first association may be based at least in part on a first resource allocation corresponding to the first PUSCH repetition, and the second association may be based at least in part on a second resource allocation corresponding to the second PUSCH repetition. In some aspects, at least one of the first resource allocation or the second resource allocation may include a time domain resource allocation, a frequency domain resource allocation, and/or the like.

In some aspects, the first association may be based at least in part on a first coding rate value corresponding to the first PUSCH repetition, and the second association may be based at least in part on a second coding rate value corresponding to the second PUSCH repetition. The first association and the second association may be based at least in part on a comparison between the first coding rate value and the second coding rate value. In some aspects, the first association may be based at least in part on determining whether the first coding rate value satisfies a threshold, and the second association may be based at least in part on determining whether the second coding rate value satisfies the threshold. The threshold may be configured by RRC signaling, or predetermined as a fixed value.

In some aspects, the first association may be based at least in part on a first DCI format corresponding to the first DCI transmission, and the second association may be based at least in part on a second DCI format corresponding to the second DCI transmission. In some aspects, at least one of the first DCI format or the second DCI format may include a DCI 0_0 format or a DCI 0_1 format. The DCI 0_0 format may be associated with a DFT-s-OFDM waveform and the DCI 0_1 format may be associated with a CP-OFDM waveform.

As shown by reference number 620, the UE 120 may transmit, and the base station 110 may receive, the first PUSCH repetition and the second PUSCH repetition. The PUSCH repetitions may be transmitted based at least in part on the PUSCH configuration, the DCI transmission, and/or the like. The first PUSCH repetition may be transmitted using one of the first waveform or the second waveform, and the second PUSCH repetition may be transmitted using the other one of the first waveform or the second waveform. In some aspects, both PUSCH repetitions may be transmitted using the same waveform. In some aspects, the UE 120 may multiplex the first PUSCH repetition and the second PUSCH repetition using at least one of frequency division multiplexing, time division multiplexing, and/or the like.

As indicated above, FIG. 6 is provided as an example. Other examples may differ from what is described with respect to FIG. 6.

Figure 7:
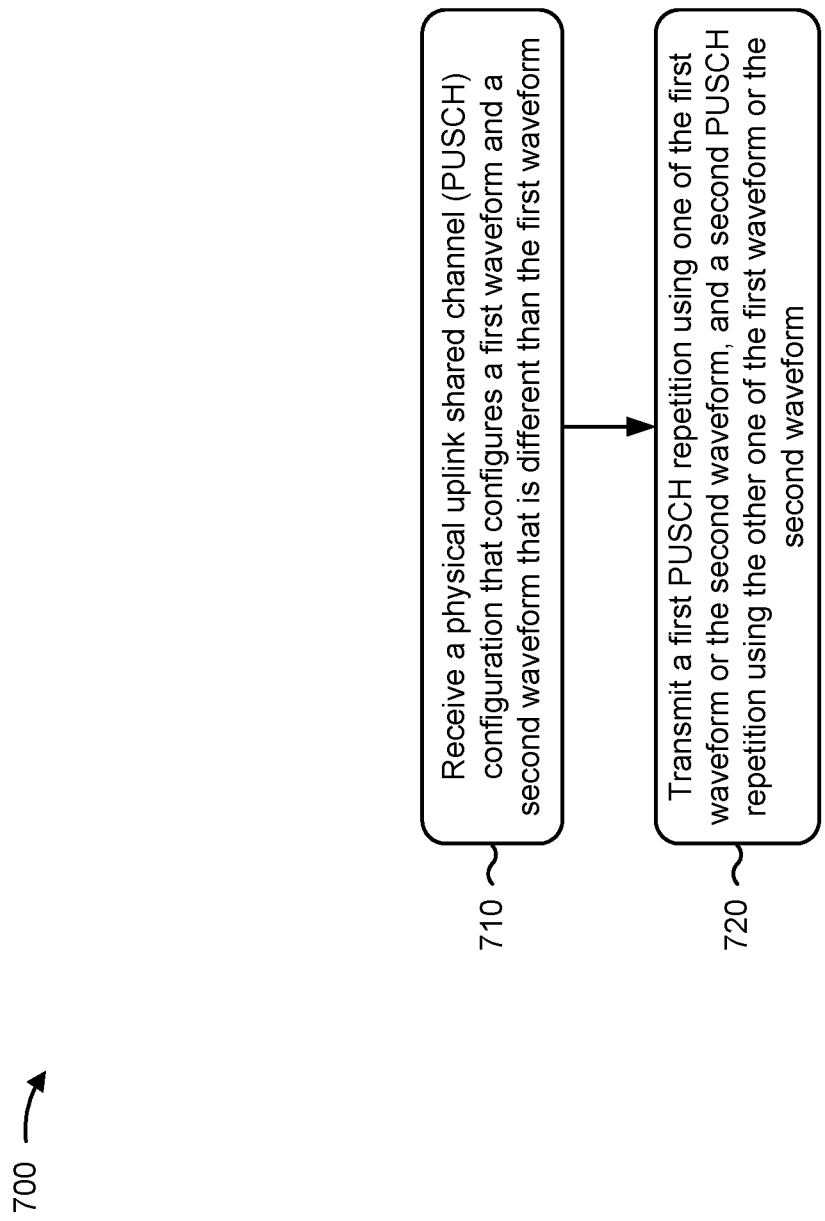
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or the like) performs operations associated with PUSCH repetition with mixed waveforms.

As shown in FIG. 7, in some aspects, process 700 may include receiving a PUSCH configuration that configures a first waveform and a second waveform that is different than the first waveform (block 710). For example, the UE (e.g., using receive processor 258, controller/processor 280, memory 282, and/or the like) may receive a PUSCH configuration that configures a first waveform and a second waveform that is different than the first waveform, as described above.

As further shown in FIG. 7, in some aspects, process 700 may include transmitting, based at least in part on the PUSCH configuration, a first PUSCH repetition using one of the first waveform or the second waveform, and a second PUSCH repetition using the other one of the first waveform or the second waveform (block 720). For example, the UE (e.g., using transmit processor 264, controller/processor 280, memory 282, and/or the like) may transmit, based at least in part on the PUSCH configuration, a first PUSCH repetition using one of the first waveform or the second waveform, and a second PUSCH repetition using the other one of the first waveform or the second waveform, as described above.

Process 700 may include additional aspects, such as any single aspect or any combination of aspects described below and/or in connection with one or more other processes described elsewhere herein.

In a first aspect, the first waveform comprises a DFT-s-OFDM waveform and the second waveform comprises a CP-OFDM waveform.

In a second aspect, alone or in combination with the first aspect, the PUSCH configuration is carried in an RRC message.

In a third aspect, alone or in combination with one or more of the first and second aspects, the RRC message configures a transform precoder parameter, and the transform precoder parameter is to enable or disable the first waveform and the second waveform based on a value, of a set of enumerated values, that is assigned to the transform precoder parameter.

In a fourth aspect, alone or in combination with one or more of the first through third aspects, the set of enumerated values comprises: a first value that corresponds to a transmission state in which the first waveform is enabled and the second waveform is disabled; a second value that corresponds to a transmission state in which the first waveform is disabled and the second waveform is enabled, and a third value that corresponds to a transmission state in which the first waveform is enabled and the second waveform is enabled.

In a fifth aspect, alone or in combination with one or more of the first through fourth aspects, process 700 includes creating an initial waveform association by associating, using a MAC-CE, a first set of PUSCH occasions with the first waveform, and a second set of PUSCH occasions with the second waveform.

In a sixth aspect, alone or in combination with one or more of the first through fifth aspects, the first set of PUSCH occasions are associated with a first uplink beam and the second set of PUSCH occasions are associated with a second uplink beam.

In a seventh aspect, alone or in combination with one or more of the first through sixth aspects, the first PUSCH repetition is associated with at least one PUSCH occasion of the first set of PUSCH occasions, and the second PUSCH repetition is associated with at least one PUSCH occasion of the second set of PUSCH occasions.

In an eighth aspect, alone or in combination with one or more of the first through seventh aspects, process 700 includes creating an updated waveform association by updating the initial waveform association using another MAC-CE.

In a ninth aspect, alone or in combination with one or more of the first through eighth aspects, updating the initial waveform association comprises associating, using the other MAC-CE, the first set of PUSCH occasions with the first waveform and the second set of PUSCH occasions with the second waveform.

In a tenth aspect, alone or in combination with one or more of the first through ninth aspects, process 700 includes multiplexing the first PUSCH repetition and the second PUSCH repetition using at least one of: frequency division multiplexing, time division multiplexing, or a combination thereof.

In an eleventh aspect, alone or in combination with one or more of the first through tenth aspects, the PUSCH configuration associates the first waveform with a first beam identifier (ID) and the second waveform with a second beam ID, and process 700 includes receiving a DCI transmission that schedules the first PUSCH repetition and the second PUSCH repetition, and the DCI transmission indicates an association between the first beam ID and one of the first PUSCH repetition or the second PUSCH repetition and an association between the second beam ID and the other one of the first PUSCH repetition or the second PUSCH repetition.

In a twelfth aspect, alone or in combination with one or more of the first through eleventh aspects, the PUSCH configuration associates the first waveform with a first panel ID and the second waveform with a second panel ID, process 700 includes receiving a DCI transmission that schedules the first PUSCH repetition and the second PUSCH repetition, and the DCI transmission indicates an association between the first panel ID and one of the first PUSCH repetition or the second PUSCH repetition and an association between the second panel ID and the other one of the first PUSCH repetition or the second PUSCH repetition.

In a thirteenth aspect, alone or in combination with one or more of the first through twelfth aspects, the PUSCH configuration associates the first waveform with a first TCI ID and the second waveform with a second TCI ID, process 700 includes receiving a DCI transmission that schedules the first PUSCH repetition and the second PUSCH repetition, and the DCI transmission indicates an association between the first TCI ID and one of the first PUSCH repetition or the second PUSCH repetition and an association between the second TCI ID and the other one of the first PUSCH repetition or the second PUSCH repetition.

In a fourteenth aspect, alone or in combination with one or more of the first through thirteenth aspects, the PUSCH configuration associates the first waveform with a first SRI ID and the second waveform with a second SRI ID, process 700 includes receiving a DCI transmission that schedules the first PUSCH repetition and the second PUSCH repetition, and the DCI transmission indicates an association between the first SRI ID and one of the first PUSCH repetition or the second PUSCH repetition and an association between the second SRI ID and the other one of the first PUSCH repetition or the second PUSCH repetition.

In a fifteenth aspect, alone or in combination with one or more of the first through fourteenth aspects, the PUSCH configuration associates the first waveform with a first TPMI and the second waveform with a second TPMI, process 700 includes receiving a DCI transmission that schedules the first PUSCH repetition and the second PUSCH repetition, and the DCI transmission indicates an association between the first TPMI and one of the first PUSCH repetition or the second PUSCH repetition and an association between the second TPMI and the other one of the first PUSCH repetition or the second PUSCH repetition.

In a sixteenth aspect, alone or in combination with one or more of the first through fifteenth aspects, the PUSCH configuration associates the first waveform with a first SRS set ID and the second waveform with a second SRS set ID, process 700 includes receiving a DCI transmission that schedules the first PUSCH repetition and the second PUSCH repetition, and the DCI transmission indicates an association between the first SRS set ID and one of the first PUSCH repetition or the second PUSCH repetition and an association between the second SRS set ID and the other one of the first PUSCH repetition or the second PUSCH repetition.

In a seventeenth aspect, alone or in combination with one or more of the first through sixteenth aspects, the PUSCH configuration associates the first waveform with a first effective coding rate and the second waveform with a second effective coding rate, process 700 includes receiving a DCI transmission that schedules the first PUSCH repetition to be transmitted in a first PUSCH occasion and the second PUSCH repetition to be transmitted in a second PUSCH occasion, and the DCI transmission indicates an association between the first effective coding rate and one of the first PUSCH occasion or the second PUSCH occasion and an association between the second effective coding rate and the other one of the first PUSCH occasion or the second PUSCH occasion.

In an eighteenth aspect, alone or in combination with one or more of the first through seventeenth aspects, transmitting the first PUSCH repetition and the second PUSCH repetition comprises performing, based at least in part on the first effective coding rate and the second effective coding rate, at least one of: a rate-matching procedure, a puncturing procedure, or a combination thereof.

In a nineteenth aspect, alone or in combination with one or more of the first through eighteenth aspects, the PUSCH configuration associates the first waveform and the second waveform with a coding rate threshold, process 700 includes receiving a DCI transmission that schedules the first PUSCH repetition to be transmitted in a first PUSCH occasion and the second PUSCH repetition to be transmitted in a second PUSCH occasion, and the DCI transmission indicates an association between a first coding rate value that satisfies the coding rate threshold and one of the first PUSCH occasion or the second PUSCH occasion and an association between a second coding rate value that fails to satisfy the coding rate threshold and the other one of the first PUSCH occasion or the second PUSCH occasion.

In a twentieth aspect, alone or in combination with one or more of the first through nineteenth aspects, the PUSCH configuration associates the first waveform with a first DMRS configuration and the second waveform with a second DMRS configuration, process 700 includes receiving a DCI transmission that schedules the first PUSCH repetition to be transmitted in a first PUSCH occasion and the second PUSCH repetition to be transmitted in a second PUSCH occasion, and the DCI transmission indicates an association between the first DMRS configuration and one of the first PUSCH occasion or the second PUSCH occasion and an association between the second DMRS configuration and the other one of the first PUSCH occasion or the second PUSCH occasion.

In a twenty-first aspect, alone or in combination with one or more of the first through twentieth aspects, the first DMRS configuration comprises a DMRS port indication and the second DMRS configuration comprises the DMRS port indication, the DMRS port indication indicates a first DMRS port associated with one of the first PUSCH occasion or the second PUSCH occasion, and a second DMRS port associated with the other one of the first PUSCH occasion or the second PUSCH occasion.

In a twenty-second aspect, alone or in combination with one or more of the first through twenty-first aspects, the first DMRS configuration comprises a first DMRS port index, of a first set of DMRS port indices having a first quantity of DMRS port indices and associated with the first waveform, the second DMRS configuration comprises a second DMRS port index, of a second set of DMRS port indices having a second quantity of DMRS port indices and associated with the second waveform, the second quantity being greater than the first quantity, and the second DMRS port index is selected from a subset of DMRS indices of the second set of DMRS port indices, the subset of DMRS indices corresponding to the first set of DMRS port indices.

In a twenty-third aspect, alone or in combination with one or more of the first through twenty-second aspects, process 700 includes receiving a first DCI transmission that schedules the first PUSCH repetition and a second DCI transmission that schedules the second PUSCH repetition, wherein the first DCI transmission indicates a first association between the first PUSCH repetition and one of the first waveform or the second waveform, and wherein the second DCI transmission indicates a second association between the second PUSCH repetition and the other one of the first waveform or the second waveform.

In a twenty-fourth aspect, alone or in combination with one or more of the first through twenty-third aspects, the first association is based at least in part on a first MCS corresponding to the first PUSCH repetition, and the second association is based at least in part on a second MCS corresponding to the second PUSCH repetition.

In a twenty-fifth aspect, alone or in combination with one or more of the first through twenty-fourth aspects, the first association and the second association are based at least in part on a comparison between a value of the first MCS and a value of the second MCS.

In a twenty-sixth aspect, alone or in combination with one or more of the first through twenty-fifth aspects, the first association is based at least in part on determining whether a value of the first MCS satisfies a threshold, and the second association is based at least in part on determining whether a value of the second MCS satisfies the threshold.

In a twenty-seventh aspect, alone or in combination with one or more of the first through twenty-sixth aspects, the first association is based at least in part on a first uplink TCI pool corresponding to the first DCI transmission, and the second association is based at least in part on a second TCI pool corresponding to the second DCI transmission.

In a twenty-eighth aspect, alone or in combination with one or more of the first through twenty-seventh aspects, the first association is based at least in part on a first CORESET corresponding to the first DCI transmission, and the second association is based at least in part on a second CORESET corresponding to the second DCI transmission.

In a twenty-ninth aspect, alone or in combination with one or more of the first through twenty-eighth aspects, the first association is based at least in part on a first resource allocation corresponding to the first PUSCH repetition, and the second association is based at least in part on a second resource allocation corresponding to the second PUSCH repetition.

In a thirtieth aspect, alone or in combination with one or more of the first through twenty-ninth aspects, at least one of the first resource allocation or the second resource allocation comprises at least one of: a time domain resource allocation, a frequency domain resource allocation, or a combination thereof.

In a thirty-first aspect, alone or in combination with one or more of the first through thirtieth aspects, the first association is based at least in part on a first coding rate value corresponding to the first PUSCH repetition, and the second association is based at least in part on a second coding rate value corresponding to the second PUSCH repetition.

In a thirty-second aspect, alone or in combination with one or more of the first through thirty-first aspects, the first association and the second association are based at least in part on a comparison between the first coding rate value and the second coding rate value.

In a thirty-third aspect, alone or in combination with one or more of the first through thirty-second aspects, the first association is based at least in part on determining whether the first coding rate value satisfies a threshold, and the second association is based at least in part on determining whether the second coding rate value satisfies the threshold.

In a thirty-fourth aspect, alone or in combination with one or more of the first through thirty-third aspects, the first association is based at least in part on a first DCI format corresponding to the first DCI transmission, and the second association is based at least in part on a second DCI format corresponding to the second DCI transmission.

In a thirty-fifth aspect, alone or in combination with one or more of the first through thirty-fourth aspects, at least one of the first DCI format or the second DCI format comprises a DCI 0_0 format or a DCI 0_1 format.

In a thirty-sixth aspect, alone or in combination with one or more of the first through thirty-fifth aspects, the DCI 0_0 format is associated with a DFT-s-OFDM waveform, and the DCI 0_1 format is associated with a CP-OFDM waveform.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station, in accordance with various aspects of the present disclosure. Example process 800 is an example where the base station (e.g., base station 110 and/or the like) performs operations associated with PUSCH repetition with mixed waveforms.

As shown in FIG. 8, in some aspects, process 800 may include transmitting a PUSCH configuration that configures a first waveform and a second waveform that is different than the first waveform (block 810). For example, the base station (e.g., using transmit processor 220, controller/processor 240, memory 242, and/or the like) may transmit a PUSCH configuration that configures a first waveform and a second waveform that is different than the first waveform, as described above.

As further shown in FIG. 8, in some aspects, process 800 may include receiving, based at least in part on the PUSCH configuration, a first PUSCH repetition using one of the first waveform or the second waveform, and a second PUSCH repetition using the other one of the first waveform or the second waveform (block 820). For example, the base station (e.g., using receive processor 238, controller/processor 240, memory 242, and/or the like) may receive, based at least in part on the PUSCH configuration, a first PUSCH repetition using one of the first waveform or the second waveform, and a second PUSCH repetition using the other one of the first waveform or the second waveform, as described above.

Process 800 may include additional aspects, such as any single aspect or any combination of aspects described below and/or in connection with one or more other processes described elsewhere herein.

In a first aspect, the first waveform comprises a DFT-s-OFDM waveform and the second waveform comprises a CP-OFDM waveform.

In a second aspect, alone or in combination with the first aspect, the PUSCH configuration is carried in an RRC message.

In a third aspect, alone or in combination with one or more of the first and second aspects, the RRC message configures a transform precoder parameter, and the transform precoder parameter is to enable or disable the first waveform and the second waveform based on a value, of a set of enumerated values, that is assigned to the transform precoder parameter.

In a fourth aspect, alone or in combination with one or more of the first through third aspects, the set of enumerated values comprises: a first value that corresponds to a transmission state in which the first waveform is enabled and the second waveform is disabled; a second value that corresponds to a transmission state in which the first waveform is disabled and the second waveform is enabled, and a third value that corresponds to a transmission state in which the first waveform is enabled and the second waveform is enabled.

In a fifth aspect, alone or in combination with one or more of the first through fourth aspects, an initial waveform is associated with, based at least in part on a MAC-CE, a first set of PUSCH occasions with the first waveform, and a second set of PUSCH occasions with the second waveform.

In a sixth aspect, alone or in combination with one or more of the first through fifth aspects, the first set of PUSCH occasions are associated with a first uplink beam and the second set of PUSCH occasions are associated with a second uplink beam.

In a seventh aspect, alone or in combination with one or more of the first through sixth aspects, the first PUSCH repetition is associated with at least one PUSCH occasion of the first set of PUSCH occasions, and the second PUSCH repetition is associated with at least one PUSCH occasion of the second set of PUSCH occasions.

In an eighth aspect, alone or in combination with one or more of the first through seventh aspects, the first PUSCH repetition and the second PUSCH repetition are multiplexed based at least in part on at least one of: frequency division multiplexing, time division multiplexing, or a combination thereof.

In a ninth aspect, alone or in combination with one or more of the first through eighth aspects, the PUSCH configuration associates the first waveform with a first beam ID and the second waveform with a second beam ID, and process 800 includes transmitting a DCI transmission that schedules the first PUSCH repetition and the second PUSCH repetition, wherein the DCI transmission indicates an association between the first beam ID and one of the first PUSCH repetition or the second PUSCH repetition and an association between the second beam ID and the other one of the first PUSCH repetition or the second PUSCH repetition.

In a tenth aspect, alone or in combination with one or more of the first through ninth aspects, the PUSCH configuration associates the first waveform with a first panel ID and the second waveform with a second panel ID, and process 800 includes transmitting a DCI transmission that schedules the first PUSCH repetition and the second PUSCH repetition, wherein the DCI transmission indicates an association between the first panel ID and one of the first PUSCH repetition or the second PUSCH repetition and an association between the second panel ID and the other one of the first PUSCH repetition or the second PUSCH repetition.

In an eleventh aspect, alone or in combination with one or more of the first through tenth aspects, the PUSCH configuration associates the first waveform with a first TCI ID and the second waveform with a second TCI ID, and process 800 includes transmitting a DCI transmission that schedules the first PUSCH repetition and the second PUSCH repetition, wherein the DCI transmission indicates an association between the first TCI ID and one of the first PUSCH repetition or the second PUSCH repetition and an association between the second TCI ID and the other one of the first PUSCH repetition or the second PUSCH repetition.

In a twelfth aspect, alone or in combination with one or more of the first through eleventh aspects, the PUSCH configuration associates the first waveform with a first SRI ID and the second waveform with a second SRI ID, and process 800 includes transmitting a DCI transmission that schedules the first PUSCH repetition and the second PUSCH repetition, wherein the DCI transmission indicates an association between the first SRI ID and one of the first PUSCH repetition or the second PUSCH repetition and an association between the second SRI ID and the other one of the first PUSCH repetition or the second PUSCH repetition.

In a thirteenth aspect, alone or in combination with one or more of the first through twelfth aspects, the PUSCH configuration associates the first waveform with a first TPMI and the second waveform with a second TPMI, and process 800 includes transmitting a DCI transmission that schedules the first PUSCH repetition and the second PUSCH repetition, wherein the DCI transmission indicates an association between the first TPMI and one of the first PUSCH repetition or the second PUSCH repetition and an association between the second TPMI and the other one of the first PUSCH repetition or the second PUSCH repetition.

In a fourteenth aspect, alone or in combination with one or more of the first through thirteenth aspects, the PUSCH configuration associates the first waveform with a first SRS set ID and the second waveform with a second SRS set ID, and process 800 includes transmitting a DCI transmission that schedules the first PUSCH repetition and the second PUSCH repetition, wherein the DCI transmission indicates an association between the first SRS set ID and one of the first PUSCH repetition or the second PUSCH repetition and an association between the second SRS set ID and the other one of the first PUSCH repetition or the second PUSCH repetition.

In a fifteenth aspect, alone or in combination with one or more of the first through fourteenth aspects, the PUSCH configuration associates the first waveform with a first effective coding rate and the second waveform with a second effective coding rate, and process 800 includes transmitting a DCI transmission that schedules the first PUSCH repetition to be transmitted in a first PUSCH occasion and the second PUSCH repetition to be transmitted in a second PUSCH occasion, wherein the DCI transmission indicates an association between the first effective coding rate and one of the first PUSCH occasion or the second PUSCH occasion and an association between the second effective coding rate and the other one of the first PUSCH occasion or the second PUSCH occasion.

In a sixteenth aspect, alone or in combination with one or more of the first through fifteenth aspects, the first PUSCH repetition and the second PUSCH repetition are transmitted based at least in part on at least one of: a rate-matching procedure, a puncturing procedure, or a combination thereof.

In a seventeenth aspect, alone or in combination with one or more of the first through sixteenth aspects, the PUSCH configuration associates the first waveform and the second waveform with a coding rate threshold, and process 800 includes transmitting a DCI transmission that schedules the first PUSCH repetition to be transmitted in a first PUSCH occasion and the second PUSCH repetition to be transmitted in a second PUSCH occasion, wherein the DCI transmission indicates an association between a first coding rate value that satisfies the coding rate threshold and one of the first PUSCH occasion or the second PUSCH occasion and an association between a second coding rate value that fails to satisfy the coding rate threshold and the other one of the first PUSCH occasion or the second PUSCH occasion.

In an eighteenth aspect, alone or in combination with one or more of the first through seventeenth aspects, the PUSCH configuration associates the first waveform with a first DMRS configuration and the second waveform with a second DMRS configuration, and process 800 includes transmitting a DCI transmission that schedules the first PUSCH repetition to be transmitted in a first PUSCH occasion and the second PUSCH repetition to be transmitted in a second PUSCH occasion, wherein the DCI transmission indicates an association between the first DMRS configuration and one of the first PUSCH occasion or the second PUSCH occasion and an association between the second DMRS configuration and the other one of the first PUSCH occasion or the second PUSCH occasion.

In a nineteenth aspect, alone or in combination with one or more of the first through eighteenth aspects, the first DMRS configuration comprises a DMRS port indication and the second DMRS configuration comprises the DMRS port indication, and the DMRS port indication indicates a first DMRS port associated with one of the first PUSCH occasion or the second PUSCH occasion and a second DMRS port associated with the other one of the first PUSCH occasion or the second PUSCH occasion.

In a twentieth aspect, alone or in combination with one or more of the first through nineteenth aspects, the first DMRS configuration comprises a first DMRS port index, of a first set of DMRS port indices having a first quantity of DMRS port indices and associated with the first waveform, the second DMRS configuration comprises a second DMRS port index, of a second set of DMRS port indices having a second quantity of DMRS port indices and associated with the second waveform, the second quantity being greater than the first quantity, and the second DMRS port index is selected from a subset of DMRS indices of the second set of DMRS port indices, the subset of DMRS indices corresponding to the first set of DMRS port indices.

In a twenty-first aspect, alone or in combination with one or more of the first through twentieth aspects, process 800 includes transmitting a first DCI transmission that schedules the first PUSCH repetition and a second DCI transmission that schedules the second PUSCH repetition, wherein the first DCI transmission indicates a first association between the first PUSCH repetition and one of the first waveform or the second waveform, and wherein the second DCI transmission indicates a second association between the second PUSCH repetition and the other one of the first waveform or the second waveform.

In a twenty-second aspect, alone or in combination with one or more of the first through twenty-first aspects, the first association is based at least in part on a first MCS corresponding to the first PUSCH repetition, and the second association is based at least in part on a second MCS corresponding to the second PUSCH repetition.

In a twenty-third aspect, alone or in combination with one or more of the first through twenty-second aspects, the first association and the second association are based at least in part on a comparison between a value of the first MCS and a value of the second MCS.

In a twenty-fourth aspect, alone or in combination with one or more of the first through twenty-third aspects, the first association is based at least in part on a determination of whether a value of the first MCS satisfies a threshold, and the second association is based at least in part on a determination of whether a value of the second MCS satisfies the threshold.

In a twenty-fifth aspect, alone or in combination with one or more of the first through twenty-fourth aspects, the first association is based at least in part on a first uplink TCI pool corresponding to the first DCI transmission, and the second association is based at least in part on a second TCI pool corresponding to the second DCI transmission.

In a twenty-sixth aspect, alone or in combination with one or more of the first through twenty-fifth aspects, the first association is based at least in part on a first CORESET corresponding to the first DCI transmission, and the second association is based at least in part on a second CORESET corresponding to the second DCI transmission.

In a twenty-seventh aspect, alone or in combination with one or more of the first through twenty-sixth aspects, the first association is based at least in part on a first resource allocation corresponding to the first PUSCH repetition, and the second association is based at least in part on a second resource allocation corresponding to the second PUSCH repetition.

In a twenty-eighth aspect, alone or in combination with one or more of the first through twenty-seventh aspects, at least one of the first resource allocation or the second resource allocation comprises at least one of: a time domain resource allocation, a frequency domain resource allocation, or a combination thereof.

In a twenty-ninth aspect, alone or in combination with one or more of the first through twenty-eighth aspects, the first association is based at least in part on a first coding rate value corresponding to the first PUSCH repetition, and the second association is based at least in part on a second coding rate value corresponding to the second PUSCH repetition.

In a thirtieth aspect, alone or in combination with one or more of the first through twenty-ninth aspects, the first association and the second association are based at least in part on a comparison between the first coding rate value and the second coding rate value.

In a thirty-first aspect, alone or in combination with one or more of the first through thirtieth aspects, the first association is based at least in part on a determination of whether the first coding rate value satisfies a threshold, and the second association is based at least in part on a determination of whether the second coding rate value satisfies the threshold.

In a thirty-second aspect, alone or in combination with one or more of the first through thirty-first aspects, the first association is based at least in part on a first DCI format corresponding to the first DCI transmission, and the second association is based at least in part on a second DCI format corresponding to the second DCI transmission.

In a thirty-third aspect, alone or in combination with one or more of the first through thirty-second aspects, at least one of the first DCI format or the second DCI format comprises a DCI 0_0 format or a DCI 0_1 format.

In a thirty-fourth aspect, alone or in combination with one or more of the first through thirty-third aspects, the DCI 0_0 format is associated with a DFT-s-OFDM waveform, and the DCI 0_1 format is associated with a CP-OFDM waveform.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a physical uplink shared channel (PUSCH) configuration that configures a first waveform and a second waveform that is different than the first waveform;
   transmitting, based at least in part on the PUSCH configuration, a first PUSCH repetition using one of the first waveform or the second waveform, and a second PUSCH repetition using the other one of the first waveform or the second waveform, wherein a PUSCH occasion of the second PUSCH repetition occurs after a PUSCH occasion of the first PUSCH repetition; and
   receiving a downlink control information (DCI) transmission that indicates an association between a first beam and one of the first PUSCH repetition or the second PUSCH repetition, and an association between a second beam and the other one of the first PUSCH repetition or the second PUSCH repetition.

2. The method of claim 1, wherein the first waveform comprises a discrete Fourier transform spread orthogonal frequency division multiplexing (OFDM) waveform and the second waveform comprises a cyclic prefix OFDM waveform.

3. The method of claim 1, wherein the PUSCH configuration is carried in a radio resource control message that configures a transform precoder parameter, wherein the transform precoder parameter is to enable or disable the first waveform and the second waveform based on a value, of a set of enumerated values, that is assigned to the transform precoder parameter, and wherein the set of enumerated values comprises:
   a first value that corresponds to a transmission state in which the first waveform is enabled and the second waveform is disabled;
   a second value that corresponds to a transmission state in which the first waveform is disabled and the second waveform is enabled; and
   a third value that corresponds to a transmission state in which the first waveform is enabled and the second waveform is enabled.

4. The method of claim 1, further comprising creating an initial waveform association by associating, using a medium access control control element (MAC-CE), a first set of PUSCH occasions with the first waveform, and a second set of PUSCH occasions with the second waveform.

5. The method of claim 4, wherein the first set of PUSCH occasions are associated with a first uplink beam and the second set of PUSCH occasions are associated with a second uplink beam.

6. The method of claim 4, wherein the first PUSCH repetition is associated with at least one PUSCH occasion of the first set of PUSCH occasions, and wherein the second PUSCH repetition is associated with at least one PUSCH occasion of the second set of PUSCH occasions.

7. The method of claim 4, further comprising creating an updated waveform association by updating the initial waveform association using another MAC-CE, wherein updating the initial waveform association comprises associating, using the other MAC-CE, the first set of PUSCH occasions with the first waveform and the second set of PUSCH occasions with the second waveform.

8. The method of claim 1, wherein the PUSCH configuration associates the first waveform with a first beam identifier (ID) and the second waveform with a second beam ID, and wherein the DCI transmission schedules the first PUSCH repetition and the second PUSCH repetition, and wherein the DCI transmission indicates an association between the first beam ID and the one of the first PUSCH repetition or the second PUSCH repetition, and an association between the second beam ID and the other one of the first PUSCH repetition or the second PUSCH repetition.

9. The method of claim 1, wherein the PUSCH configuration associates the first waveform with a first panel identifier (ID) and the second waveform with a second panel ID, and wherein the DCI transmission schedules the first PUSCH repetition and the second PUSCH repetition, and wherein the DCI transmission indicates an association between the first panel ID and the one of the first PUSCH repetition or the second PUSCH repetition, and an association between the second panel ID and the other one of the first PUSCH repetition or the second PUSCH repetition.

10. The method of claim 1, wherein the PUSCH configuration associates the first waveform with a first transmission configuration indicator (TCI) identifier (ID) and the second waveform with a second TCI ID, and wherein the DCI transmission schedules the first PUSCH repetition and the second PUSCH repetition, and wherein the DCI transmission indicates an association between the first TCI ID and the one of the first PUSCH repetition or the second PUSCH repetition, and an association between the second TCI ID and the other one of the first PUSCH repetition or the second PUSCH repetition.

11. The method of claim 1, wherein the PUSCH configuration associates the first waveform with a first sounding reference signal (SRS) resource indicator (SRI) identifier (ID) and the second waveform with a second SRI ID, and wherein the DCI transmission schedules the first PUSCH repetition and the second PUSCH repetition, and wherein the DCI transmission indicates an association between the first SRI ID and the one of the first PUSCH repetition or the second PUSCH repetition, and an association between the second SRI ID and the other one of the first PUSCH repetition or the second PUSCH repetition.

12. The method of claim 1, wherein the PUSCH configuration associates the first waveform with a first transmitted precoding matrix indicator (TPMI) and the second waveform with a second TPMI, and wherein the DCI transmission schedules the first PUSCH repetition and the second PUSCH repetition, and wherein the DCI transmission indicates an association between the first TPMI and the one of the first PUSCH repetition or the second PUSCH repetition, and an association between the second TPMI and the other one of the first PUSCH repetition or the second PUSCH repetition.

13. The method of claim 1, wherein the PUSCH configuration associates the first waveform with a first sounding reference signal (SRS) set identifier (ID) and the second waveform with a second SRS set ID, and wherein the DCI transmission schedules the first PUSCH repetition and the second PUSCH repetition, and wherein the DCI transmission indicates an association between the first SRS set ID and the one of the first PUSCH repetition or the second PUSCH repetition, and an association between the second SRS set ID and the other one of the first PUSCH repetition or the second PUSCH repetition.

14. The method of claim 1, wherein the PUSCH configuration associates the first waveform with a first effective coding rate and the second waveform with a second effective coding rate, and wherein the DCI transmission schedules the first PUSCH repetition to be transmitted using first time-frequency resources and the second PUSCH repetition to be transmitted using second time-frequency resources, and wherein the DCI transmission indicates an association between the first effective coding rate and one of the first time-frequency resources or the second time-frequency resources, and an association between the second effective coding rate and the other one of the first time-frequency resources or the second time-frequency resources.

15. The method of claim 1, wherein the PUSCH configuration associates the first waveform and the second waveform with a coding rate threshold, and wherein the DCI transmission schedules the first PUSCH repetition to be transmitted using first time-frequency resources and the second PUSCH repetition to be transmitted using second time-frequency resources, and wherein the DCI transmission indicates an association between a first coding rate value that satisfies the coding rate threshold and one of the first time-frequency resources or the second time-frequency resources, and an association between a second coding rate value that fails to satisfy the coding rate threshold and the other one of the first time-frequency resources or the second time-frequency resources.

16. The method of claim 1, wherein the PUSCH configuration associates the first waveform with a first demodulation reference signal (DMRS) configuration and the second waveform with a second DMRS configuration, and wherein the DCI transmission schedules the first PUSCH repetition to be transmitted using first time-frequency resources and the second PUSCH repetition to be transmitted using second time-frequency resources, and wherein the DCI transmission indicates an association between the first DMRS configuration and one of the first time-frequency resources or the second time-frequency resources, and an association between the second DMRS configuration and the other one of the first time-frequency resources or the second time-frequency resources.

17. The method of claim 1, further comprising receiving a second DCI transmission that schedules the first PUSCH repetition and a third DCI transmission that schedules the second PUSCH repetition wherein the second DCI transmission indicates a first association between the first PUSCH repetition and the one of the first waveform or the second waveform, and wherein the third DCI transmission indicates a second association between the second PUSCH repetition and the other one of the first waveform or the second waveform.

18. The method of claim 1, wherein the PUSCH occasion of the second PUSCH repetition occurs before a second PUSCH occasion of the first PUSCH repetition.

19. The method of claim 1, wherein the DCI transmission schedules the first PUSCH repetition and indicates respective waveforms that are to be associated with each PUSCH repetition.

20. A method of wireless communication performed by a base station, comprising:
transmitting a physical uplink shared channel (PUSCH) configuration that configures a first waveform and a second waveform that is different than the first waveform;
receiving, based at least in part on the PUSCH configuration, a first PUSCH repetition using one of the first waveform or the second waveform, and a second PUSCH repetition using the other one of the first waveform or the second waveform, wherein a PUSCH occasion of the second PUSCH repetition occurs after a PUSCH occasion of the first PUSCH repetition; and
transmitting a downlink control information (DCI) transmission that indicates an association between a first beam and one of the first PUSCH repetition or the second PUSCH repetition, and an association between a second beam and the other one of the first PUSCH repetition or the second PUSCH repetition.

21. The method of claim 20, wherein the first waveform comprises a discrete Fourier transform spread orthogonal frequency division multiplexing (OFDM) waveform and the second waveform comprises a cyclic prefix OFDM waveform.

22. The method of claim 20, wherein the PUSCH configuration is carried in a radio resource control message that configures a transform precoder parameter, wherein the transform precoder parameter is to enable or disable the first waveform and the second waveform based on a value, of a set of enumerated values, that is assigned to the transform precoder parameter, and wherein the set of enumerated values comprises:
a first value that corresponds to a transmission state in which the first waveform is enabled and the second waveform is disabled;
a second value that corresponds to a transmission state in which the first waveform is disabled and the second waveform is enabled; and
a third value that corresponds to a transmission state in which the first waveform is enabled and the second waveform is enabled.

23. The method of claim 20, wherein an initial waveform association, based at least in part on a medium access control control element (MAC-CE), associates a first set of PUSCH occasions with the first waveform, and a second set of PUSCH occasions with the second waveform.

24. The method of claim 23, wherein the first set of PUSCH occasions are associated with a first uplink beam and the second set of PUSCH occasions are associated with a second uplink beam.

25. The method of claim 23, wherein the first PUSCH repetition is associated with at least one PUSCH occasion of the first set of PUSCH occasions, and wherein the second PUSCH repetition is associated with at least one PUSCH occasion of the second set of PUSCH occasions.

26. A user equipment (UE) for wireless communication, comprising:
one or more memories; and
one or more processors coupled to the one or more memories, the one or more memories and the one or more processors configured to:
receive a physical uplink shared channel (PUSCH) configuration that configures a first waveform and a second waveform that is different than the first waveform;
transmit, based at least in part on the PUSCH configuration, a first PUSCH repetition using one of the first waveform or the second waveform, and a second PUSCH repetition using the other one of the first waveform or the second waveform, wherein a PUSCH occasion of the second PUSCH repetition occurs after a PUSCH occasion of the first PUSCH repetition; and
receive a downlink control information (DCI) transmission that indicates an association between a first beam and one of the first PUSCH repetition or the second PUSCH repetition, and an association between a second beam and the other one of the first PUSCH repetition or the second PUSCH repetition.

27. The UE of claim 26, wherein the first waveform comprises a discrete Fourier transform spread orthogonal frequency division multiplexing (OFDM) waveform and the second waveform comprises a cyclic prefix OFDM waveform.

28. The UE of claim 26, further comprising creating an initial waveform association by associating, using a medium access control control element (MAC-CE), a first set of PUSCH occasions with the first waveform, and a second set of PUSCH occasions with the second waveform, and wherein the first set of PUSCH occasions are associated with a first uplink beam and the second set of PUSCH occasions are associated with a second uplink beam.

29. The UE of claim 28, further comprising creating an updated waveform association by updating the initial waveform association using another MAC-CE, wherein updating the initial waveform association comprises associating, using the other MAC-CE, the first set of PUSCH occasions with the first waveform and the second set of PUSCH occasions with the second waveform.

30. A base station for wireless communication, comprising:
one or more memories; and
one or more processors coupled to the one or more memories, the one or more memories and the one or more processors configured to:
transmit a physical uplink shared channel (PUSCH) configuration that configures a first waveform and a second waveform that is different than the first waveform;
receive, based at least in part on the PUSCH configuration, a first PUSCH repetition using one of the first waveform or the second waveform, and a second PUSCH repetition using the other one of the first waveform or the second waveform, wherein a PUSCH occasion of the second PUSCH repetition occurs after a PUSCH occasion of the first PUSCH repetition; and
transmit a downlink control information (DCI) transmission that indicates an association between a first beam and one of the first PUSCH repetition or the second PUSCH repetition, and an association between a second beam and the other one of the first PUSCH repetition or the second PUSCH repetition.

* * * * *